US012683255B2

(12) United States Patent (10) Patent No.: US 12,683,255 B2
Kwon (45) Date of Patent: Jul. 14, 2026

(54) SECONDARY BATTERY

(71) Applicant: SK ON CO., LTD., Seoul (KR)

(72) Inventor: Myeong Seon Kwon, Daejeon (KR)

(73) Assignee: SK On Co., Ltd., Seoul (KR)

( * ) Notice: Subject to any disclaimer, the term of this patent is extended or adjusted under 35 U.S.C. 154(b) by 603 days.

(21) Appl. No.: 18/304,353

(22) Filed: Apr. 21, 2023

(65) Prior Publication Data

US 2023/0361396 A1 Nov. 9, 2023

(30) Foreign Application Priority Data

May 4, 2022 (KR) ........................ 10-2022-0055470

(51) Int. Cl.
| | |
|---|---|
| *H01M 50/581* | (2021.01) |
| *H01M 4/04* | (2006.01) |
| *H01M 4/62* | (2006.01) |
| *H01M 50/105* | (2021.01) |
| *H01M 50/172* | (2021.01) |
| *H01M 50/46* | (2021.01) |

(52) U.S. Cl.
CPC ....... *H01M 50/581* (2021.01); *H01M 4/0404* (2013.01); *H01M 4/622* (2013.01); *H01M 4/625* (2013.01); *H01M 50/105* (2021.01); *H01M 50/172* (2021.01); *H01M 50/46* (2021.01); *H01M 2200/10* (2013.01)

(58) Field of Classification Search
None
See application file for complete search history.

(56) References Cited

U.S. PATENT DOCUMENTS

| | | | | |
|---|---|---|---|---|
| 6,396,384 | B1* | 5/2002 | Blok ...................... | H01C 7/028 |
| | | | | 252/511 |
| 2007/0278662 | A1* | 12/2007 | Miyake .............. | G01R 31/2879 |
| | | | | 257/700 |
| 2010/0119881 | A1* | 5/2010 | Patel ................. | H01M 10/0525 |
| | | | | 429/7 |
| 2011/0119881 | A1* | 5/2011 | Lee ........................ | B21D 28/12 |
| | | | | 29/50 |
| 2017/0033399 | A1* | 2/2017 | Fujisawa .............. | H01M 4/663 |
| 2019/0190030 | A1* | 6/2019 | Chu .................... | H01M 50/581 |
| 2024/0213576 | A1* | 6/2024 | Shin .................... | H01M 10/647 |

FOREIGN PATENT DOCUMENTS

| | | |
|---|---|---|
| KR | 10-0864694 B1 | 10/2008 |
| KR | 10-2014-0147412 A | 12/2014 |
| KR | 10-2018-0095982 A | 8/2018 |

* cited by examiner

*Primary Examiner* — Scott J. Chmielecki
(74) *Attorney, Agent, or Firm* — IP & T GROUP LLP

(57) ABSTRACT

A secondary battery is disclosed. The secondary battery includes an electrode assembly a positive electrode and a negative electrode including an electrode portion in which an electrode mixture layer containing an electrode active material is formed on a portion of an electrode current collector, and an electrode uncoated portion not including the electrode mixture layer. The electrode assembly comprises a converging portion in which an end of the electrode uncoated portion is collected and a bonding portion in which at least a portion of the converging portion and an electrode lead are joined, and a portion of the electrode lead protrudes to an outside of the battery case. At least one of the positive electrode and the negative electrode includes a polymer compound layer on at least a portion of one surface or both surfaces of the electrode uncoated portion.

12 Claims, 4 Drawing Sheets

I-I'

'A'

121  122  110  123

140

'B'

SECONDARY BATTERY

CROSS-REFERENCE TO RELATED APPLICATION(S)

This patent document claims the priority and benefits of Korean Patent Application No. 10-2022-0055470 filed on May 4, 2022, the disclosure of which is incorporated herein by reference in its entirety.

TECHNICAL FIELD

The technology and implementations disclosed in this patent document generally relate to a secondary battery.

BACKGROUND

Lithium ion secondary batteries are batteries capable of repeating charging and discharging, and demand for the lithium ion secondary battery as an energy source is rapidly increasing as technology development and demand for mobile devices and electric vehicles have recently increased.

Lithium ion secondary batteries have a problem in which the cell pressure increases due to vaporization of an electrolyte solution as the internal temperature increases. When a certain threshold is reached, the temperature of the cell increases rapidly, and a chemical exothermic reaction occurs between the electrolyte and the electrode, further increasing the cell pressure. As described above, when the cell temperature continues to increase, there is a concern that thermal runaway may occur, which may furthermore lead to a problem such as thermal propagation.

Therefore, there is a need for a secondary battery having excellent stability in which thermal runaway and thermal propagation problems may be prevented.

SUMMARY

The disclosed technology can be implemented in some embodiments to provide a secondary battery having excellent safety by preventing additional current from being applied by blocking current flow by selectively inducing disconnection between an electrode tab and an electrode lead, before the internal temperature of a secondary battery rapidly increases, and thus, capable of suppressing occurrence of additional thermal runaway in the battery.

In some embodiments of the disclosed technology, a secondary battery includes an electrode assembly including a positive electrode and a negative electrode alternately stacked in a battery case and a separator interposed between the positive and negative electrodes. The positive electrode and the negative electrode respectively include an electrode portion in which an electrode mixture layer containing an electrode active material is formed on a portion of an electrode current collector, and an electrode uncoated portion not including the electrode mixture layer. The electrode assembly comprises a converging portion in which an end of the electrode uncoated portion is collected and a bonding portion in which at least a portion of the converging portion and an electrode lead are joined, and a portion of the electrode lead protrudes to an outside of the battery case. At least one of the positive electrode and the negative electrode includes a polymer compound layer on at least a portion of one surface or both surfaces of the electrode uncoated portion. The polymer compound layer includes an expandable polymer compound of a composite of a hydroxyl group-containing compound and silica.

Electrode uncoated portions of the negative electrode and the positive electrode located on outermost portions among the electrode uncoated portions may include the polymer compound layer on a surface facing an inner surface of the electrode assembly.

The expandable polymer compound may be a composite of polyurethane and silica.

The polymer compound layer may increase in volume by 30 to 4,000 times at 80° C. or higher compared to a volume at room temperature.

The polymer compound layer may have a thickness of 3 to 25 μm.

The polymer compound may be in a form of beads, pillars, flakes, or powder.

The polymer compound may contain expanded graphite filled inside of the polymer compound.

The polymer compound layer may be formed on a portion of the electrode uncoated portion between the electrode portion and the converging portion.

The polymer compound layer may be biased toward the converging portion.

A ½ point of a total length of the polymer compound layer may be located on a side of the converging portion with a ½ point of a length of the electrode uncoated portion between the electrode portion and the converging portion as a center.

The polymer compound layer may be biased toward the electrode portion.

A ½ point of a total length of the polymer compound layer may be the same as a ½ point of a length of the electrode uncoated portion between the electrode portion and the converging portion.

The electrode leads of the positive electrode and the negative electrode may protrude in opposite directions of the battery case, and may protrude in the same direction thereof.

BRIEF DESCRIPTION OF DRAWINGS

Certain aspects, features, and advantages of the disclosed technology are illustrated by the following detailed description with reference to the accompanying drawings.

DETAILED DESCRIPTION

Figure 1:
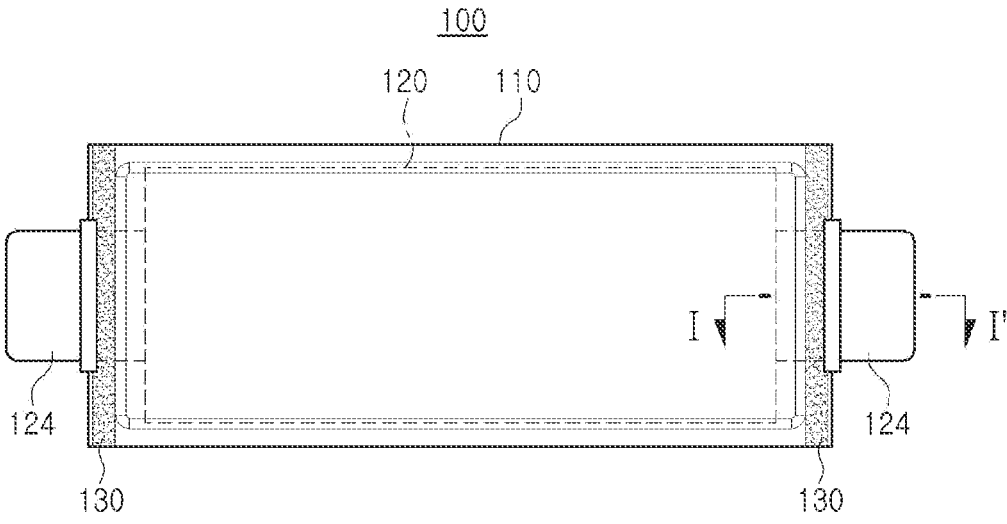
FIG. 1 schematically illustrates a secondary battery according to an embodiment.

Features of the disclosed technology disclosed in this patent document are described by example embodiments with reference to the accompanying drawings.

Elements indicated with the same reference numerals in the accompanying drawings to aid understanding of the description of the embodiments are the same elements, and among the components that perform the same action in respective embodiments, related components are indicated by the same or similar reference numerals.

In addition, to clarify the gist of the disclosed technology, descriptions of elements and techniques well known by the related art will be omitted. Hereinafter, the disclosed technology will be described in detail with reference to the accompanying drawings.

However, the spirit of the disclosed technology is not limited to the presented embodiments, and may be suggested in other forms in which specific components are added, changed, or deleted by those skilled in the art, and it should be noted that this is also included within the scope of the same spirit as the disclosed technology.

FIG. 1 schematically illustrates a secondary battery 100 according to an embodiment. As illustrated in FIG. 1, the secondary battery 100 includes a battery case 110, an electrode assembly 120 is accommodated inside of the battery case 110, and electrolyte (not illustrated) may be filled therein.

In an embodiment, the battery case 110 is not particularly limited in shape, material, and the like as long as it is generally used in the field of secondary batteries. For example, the battery case 110 may be a pouch type formed by sequentially stacking a first resin layer, a metal layer, and a second resin layer. In addition, although not particularly limited, an adhesive layer for bonding the metal layer and the second resin layer may be present between the metal layer and the second resin layer.

The first resin layer provides thermal adhesiveness, and a material capable of being melted by heat to provide adhesiveness may be applied, and for example, may be composed of a polyolefin-based resin such as polypropylene (PP) resin. In addition, the second resin layer may be composed of at least one of a nylon resin and a polyethylene terephthalate (PET) resin. On the other hand, the metal layer may be an aluminum foil.

The battery case 110 may include a case body portion accommodating the electrode assembly and a cover portion. The case body portion and the cover portion may have the same material, the case body portion and the cover portion may be separated from each other, and a single battery case may be folded to provide the case body portion and the cover portion.

In a state in which the electrode assembly is accommodated, the first resin layer of the case body portion and the first resin layer of the cover portion may be sealed by contacting each other and applying heat and pressure. At this time, in the case in which the battery case is separated into the case body portion and the cover portion, four sides may be sealed, and in the case in which one pouch is folded and provided as the battery case body and the cover portion, three sides may be sealed. Furthermore, if necessary, an envelope-type pouch may be used as a battery case, and in this case, two-side sealing or one-side sealing may be performed.

In an embodiment, the electrode assembly 120 is accommodated in the battery case 110. The electrode assembly 120 includes at least one positive electrode that includes a positive electrode portion having a positive electrode mixture layer containing a positive electrode active material on at least one surface of a positive electrode current collector, and an electrode uncoated portion that does not include a positive electrode mixture layer, and at least one negative electrode that includes a negative electrode portion having a negative electrode mixture layer containing a negative electrode active material on at least one surface of a negative electrode current collector and an electrode uncoated portion not including the negative electrode mixture layer, and a separator may be interposed between the positive electrode and the negative electrode. The positive electrode portion and the negative electrode portion may be referred to as an electrode portion if necessary, and may be expressed separately from the electrode uncoated portion.

For example, the electrode assembly 120 may be a stack type electrode assembly in which a plurality of positive electrodes and negative electrodes are alternately stacked and a separator is interposed between the positive electrode and the negative electrode, may be a stack-and-folding type electrode assembly in which a plurality of positive electrodes and negative electrodes are alternately stacked with each other by folding a rectangular separator, or may be a winding type electrode assembly in which a rectangular positive electrode and a rectangular negative electrode and a rectangular separator between the positive electrode and the negative electrode are stacked and wound in one direction, and may be a combination of two or more thereof.

In the electrode assembly 120, a converging portion 131 is formed by collecting and welding the electrode uncoated portions 123 drawn out from respective electrodes of respective electrode assemblies and provided to an electrode tab, and the converging portion 131 is connected to the electrode lead 124 by forming a bonding portion 132 by welding. The electrode leads 124 of the negative electrode and the positive electrode may be drawn out in one direction of the electrode assembly 120, and as illustrated in FIG. 1, the electrode leads 124 of the negative electrode and the positive electrode may be drawn out in both directions of the electrode assembly 120, respectively.

The electrode lead 124 connected to the electrode uncoated portion 123 is formed extending toward the outside of the battery case 110, and may serve to provide a path for electrons to move between the inside and outside of the battery case 110.

A connection method between the electrode uncoated portion 123 and the electrode lead 124 is not particularly limited, and for example, the electrode uncoated portion 123 may be connected to the electrode lead 124 by welding. A portion of the electrode lead 124 is exposed to the outside of the battery case 110, and the electrode lead 124 exposed to the outside of the battery case 110 may be electrically connected to an external terminal.

In an embodiment, in a state in which the electrode lead 124 is drawn out of the battery case 110, the first resin layers of the body portion and the cover portion face each other and are thermally fused to form a sealing portion 130. Although not particularly limited, the sealing portion 130 may be formed along the outer circumference of the battery case 110, and as described above, the sealing portion 130 may be formed on three or four sides of the battery case. In detail, the sealing portion 130 may be formed on a surface from which the electrode lead 124 is drawn, out of the outer circumferential portion of the battery case 110.

In addition, if necessary, a sealant portion may be interposed between the electrode lead and the battery case and be sealed. This is schematically illustrated in FIG. 3. FIG. 3 is an enlarged view of area A of FIG. 2, and sealant portions 127 may be interposed on both sides of the electrode lead 124, and sealing strength between the electrode lead 124 and the first resin layer of the battery case 110 may be improved by the sealant portion 127.

In a secondary battery, when the internal temperature rises during battery operation, the electrolyte vaporizes or gas is generated due to a side reaction between the electrolyte and the electrode, and a thermal runaway phenomenon in which the battery case expands due to an increase in internal pressure of the battery may occur. In the case in which such a thermal runaway phenomenon occurs in any one battery, heat propagates to an adjacent battery, causing a chain of thermal runaway and fire.

Therefore, as an embodiment of the disclosed technology, when a thermal runaway phenomenon reaching a specific temperature or higher occurs, the electrical connection between the electrode uncoated portion and the electrode lead is blocked to prevent additional current from being supplied, thereby preventing thermal runaway, and furthermore, stably maintaining performance of the battery to improve safety by preventing explosion.

Figure 2:
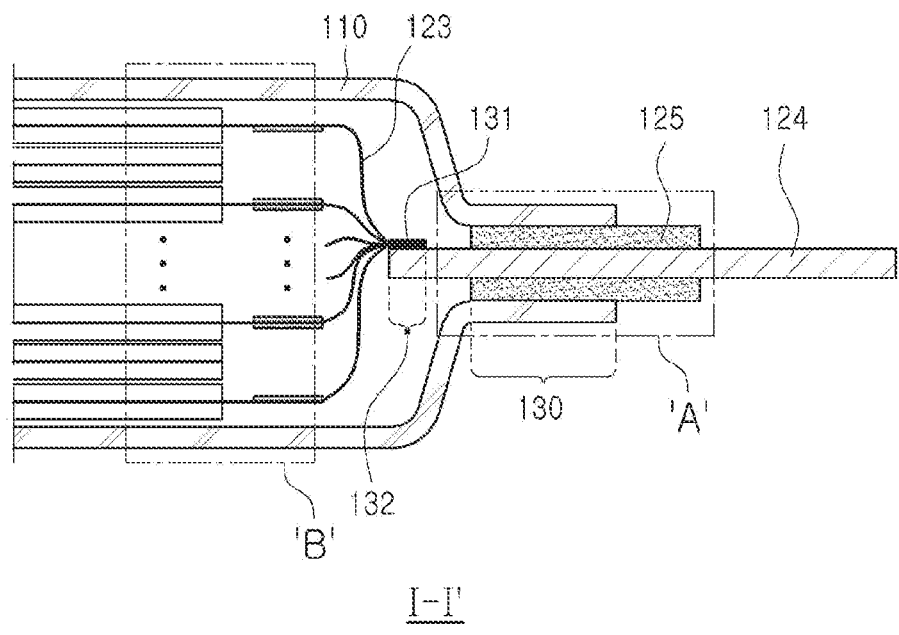
FIG. 2 is a cross-sectional view schematically illustrating a cross section taken along line I-I' of FIG. 1.
Figure 3:
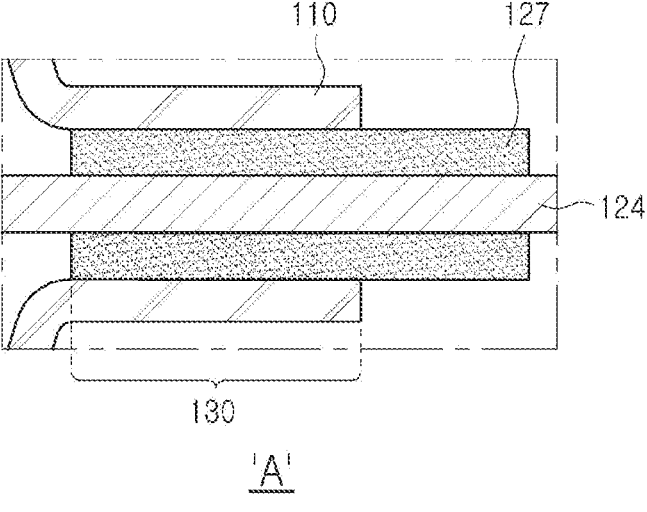
FIG. 3 is an enlarged view of area A of FIG. 2, schematically illustrating an example in which a sealant portion is interposed between an electrode lead and a battery case.

To this end, an example embodiment of the disclosed technology is schematically illustrated in FIG. 2. FIG. 2 schematically illustrates an example in which a polymer compound layer 140 is formed on an electrode uncoated portion 123 of either a positive electrode or a negative electrode, and the polymer compound layer 140 may be formed on the electrode uncoated portions 123 drawn out from respective electrode current collectors.

For example, the polymer compound layer 140 may be formed on both sides of all the electrode uncoated portions 123, the polymer compound layer 140 may be formed on only one surface of all the electrode uncoated portions 123, and the polymer compound layer 140 may also be formed without any particular regularity. For example, as long as the electrical connection between the electrode uncoated portion 123 and the electrode lead 124 may be blocked due to the volume expansion of the polymer compound layer 140 according to the temperature change inside the battery, the polymer compound layer 140 may be applied without particular limitation.

Figure 4:
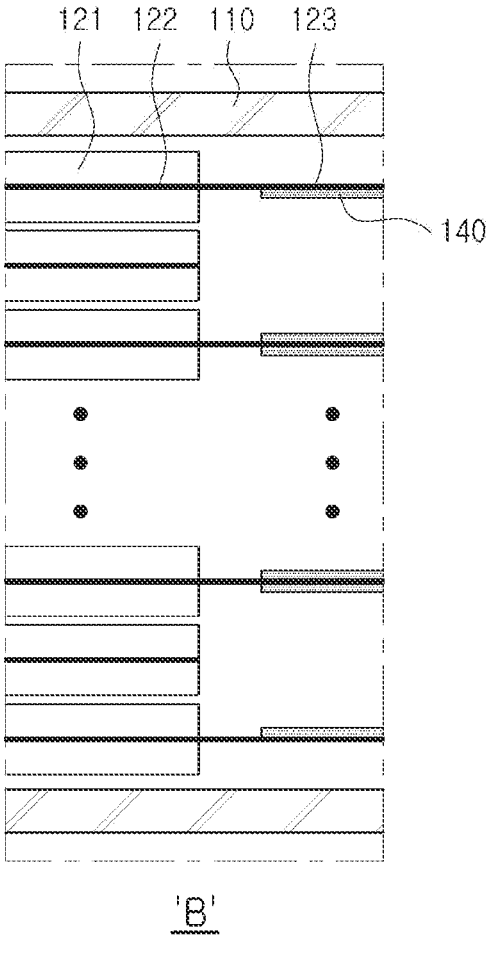
FIG. 4 is an enlarged cross-sectional view of area B of FIG. 2, schematically illustrating an electrode assembly in which a polymer compound layer is formed on an electrode uncoated portion of one of the positive electrode and the negative electrode.

In more detail, as illustrated in FIG. 2 and FIG. 4 in which area B of FIG. 2 is enlarged, the polymer compound layer 140 may be formed on one surface of the electrode uncoated portion 123 facing the inside of the electrode assembly 120 in the outermost electrode uncoated portion 123 among the electrode uncoated portions 123, and may be formed on both sides of the electrode uncoated portion located inside the electrode assembly 120.

In the case of the electrode uncoated portion of the outermost electrode, the polymer compound layer 140 expands as the temperature inside the battery rises and meets the polymer compound layer 140 formed on the electrode uncoated portion 123 of the adjacent electrode of the same type, thereby further significantly increasing the volume expansion, and as a result, the electrical connection may be blocked on the bonding portion 132 where the electrode uncoated portion 123 and the electrode lead 124 are joined.

FIG. 4 is a view illustrating one electrode of a negative electrode and a positive electrode in a secondary battery in which electrode leads 124 protrude in both directions by way of example. For example, when the electrode illustrated in FIG. 4 is a negative electrode, the electrode uncoated portion 123 of the positive electrode is drawn out and collected in the opposite direction, which is not illustrated, and is bonded to the electrode lead 124 of the positive electrode and protrudes out of the battery case 110.

In this manner, in the electrode drawn out in the opposite direction, for example, the electrode uncoated portion 123 of the positive electrode, the polymer compound layer 140 is formed on the surface of the electrode uncoated portion 123 of the positive electrode located at the outermost part, facing the inside of the electrode assembly 120 as described above.

Further, the polymer compound layer 140 may not be included on the surface of the electrode uncoated portion 123 of the positive electrode located on the outermost side, facing the outside. In addition, the polymer compound layer 140 may be formed on both sides of the electrode uncoated portion 123 located on the inner side.

Furthermore, in the same manner as above, for the secondary battery in which the electrode leads 124 are drawn out in the same direction, the polymer compound layer 140 may also be formed only on the surface facing the inside of the electrode assembly 120 in the respective outermost electrode uncoated portions 123 of the negative electrode and the positive electrode, and the polymer compound layer 140 may be formed on both sides of the electrode uncoated portion 123 located inside.

The polymer compound layer 140 may include a polymer compound of which the volume changes as the internal temperature of the battery increases. In detail, the polymer compound may be a thermally expandable polymer compound of which the volume expands as the internal temperature of the battery increases.

The temperature at which the volume of the polymer compound layer 140 changes is not particularly limited, but may be 80° C. or higher, and for example, may be 80° C. or more, 85° C. or more, 90° C. or more, or 100° C. or more. On the other hand, the temperature may be 130° C. or less, for example, 120° C. or less. In the case of thermal expansion at a temperature of 130° C. or lower, the flow of current may be blocked even after heat is generated in the cell, preventing additional heat supply and preventing thermal propagation to adjacent cells. in the case in which the polymer compound layer thermally expands at a temperature of 120° C. or lower, occurrence of thermal runaway may be prevented in advance.

Examples of the thermally expandable polymer compound included in the polymer compound layer 140 include, but are not limited to, a composite of a hydroxy group-containing compound and silica, and examples of the composite of such a hydroxy group-containing compound and silica may include a composite of polyurethane and silica.

In an embodiment, the form of the polymer compound is not particularly limited, and for example, the polymer compound may be in the form of beads, pillars, flakes, or powder. Depending on the type of polymer compound and the location where the polymer compound layer 140 is formed, an appropriate type of polymer compound may be selected and used.

In addition, the polymer compound may be filled with expanded graphite inside the polymer compound. In this case, the expanded graphite means graphite having a volume expansibility at a certain temperature or higher, and the degree of volume expansion is not particularly limited, and may be one hundred times or more than the volume before expansion, and the components or manufacturing method of expanded graphite are not particularly limited.

The volume of the polymer compound layer 140 at 80° C. or higher may increase by 30 to 4,000 times compared to the volume at room temperature (25° C.). As the temperature inside the battery rises, the volume of the polymer compound layer 140 formed on the electrode uncoated portion 123 expands, and the gap between the electrode uncoated portions 123 is enlarged to cut off the electrical connection between the converging portion 131 of the electrode uncoated portion 123 and the electrode lead 124. As a result, by preventing the supply of current between the electrode tab and the electrode lead, additional temperature rise may be suppressed.

In an embodiment, the polymer compound layer 140 may have a thickness of 3 μm or more. If the thickness is less than 3 μm, it may be difficult to block the electrical connection between the electrode uncoated portion 123 and the electrode lead 124 due to insufficient expansion of the polymer compound layer 140. If the thickness of the polymer compound layer 140 is 3 μm or more, the upper limit thereof is not particularly limited, and may be, for example, 25 μm or less.

The polymer compound layer 140 may be formed on at least a partial region of the electrode uncoated portion 123, and in detail, as illustrated in FIGS. 2 and 4, may be formed between the end of the electrode portion 121 formed on the electrode current collector 122 and the converging portion 131 where the electrode uncoated portions 123 converge, for example, in the entire area between the electrode portion 121 and the converging portion 131, and may also be formed in at least a portion thereof. Therefore, as long as the polymer compound layer 140 expands by heat and may thus block the electrical connection between the electrode uncoated portion 123 and the electrode lead 124, the detailed position where the polymer compound layer 140 is formed is not particularly limited.

For example, the polymer compound layer 140 may be formed to be biased toward the converging portion 131, between the electrode portion 121 and the converging portion 131. In more detail, when a distance between the electrode portion 121 and the converging portion 131, for example, between the boundary between the electrode portion 121 and the electrode uncoated portion 123 and the converging portion 131 where a plurality of electrode uncoated portions 123 drawn from the electrode current collectors 122 of the same type of electrodes converge and are welded, is L1; and when the center of the distance L1, for example, the point at ½ of L1, is O1, the center of the length L2 of the polymer compound layer 140, for example, a point O2 at ½ of L2 may be located on the side of the converging portion 131.

Figure 5:
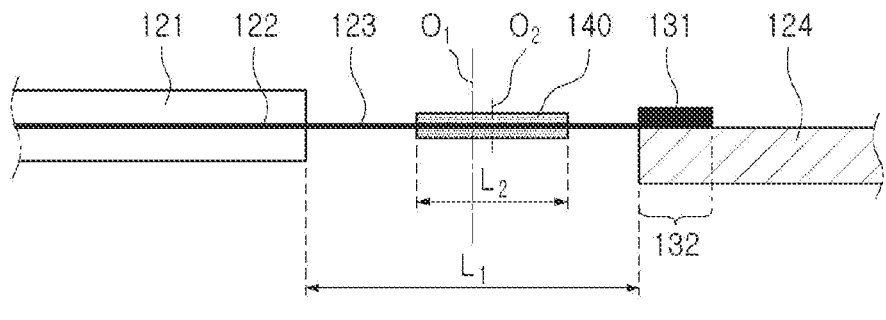
FIG. 5 is a cross-sectional view schematically illustrating an example in which a polymer compound layer is formed on an electrode uncoated portion of one of a positive electrode and a negative electrode.
Figure 6:
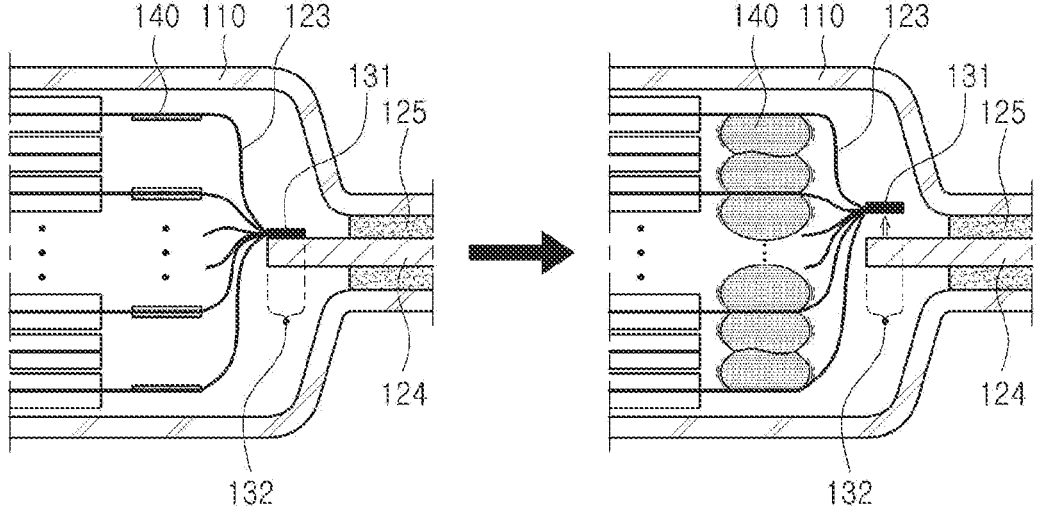
FIG. 6 is a diagram schematically illustrating a concept in which an electrical connection between an electrode tab and an electrode lead is blocked according to an embodiment.

This is specifically illustrated in FIG. 5. As illustrated in FIG. 5, when the length of the polymer compound layer 140 formed on the surface of the electrode uncoated portion 123 is L2, O2, which is ½ of L2, may be located on the side of the converging portion 131 compared to the center O1 of the distance between the electrode portion 121 and the converging portion 131.

As described above, when the polymer compound layer 140 is located on the side of the converging portion 131, in the case in which the temperature rises due to heat generation inside the battery, the polymer compound layer 140 thermally expands, and thus, the electrical connection of the bonding portion 132 where the converging portion 131 and the electrode lead 124 are joined may be more easily blocked.

FIG. 5 illustrates an embodiment, but is not limited thereto, and as long as the degree of thermal expansion of the polymer compound layer 140 is capable of blocking the bonding between the converging portion 131 and the electrode lead 124 in the bonding portion 132, the center O1 of the distance L1 between the electrode portion 121 and the converging portion 131 may coincide with the center O2 of the length L2 of the polymer compound layer 140, and in addition, as schematically illustrated in FIG. 2, the center O2 of the length L2 of the polymer compound layer 140 may also be formed biased toward the electrode portion.

According to each embodiment as described above, when heat is generated inside the battery and the internal temperature rises to reach a predetermined temperature, for example, the thermal expansion temperature of the polymer compound layer 140, as illustrated in FIG. 5, the polymer compound layer 140 formed on the electrode uncoated portion 123 expands, and due to the thermal expansion, bonding may be cut off and electrical connection may be blocked in the bonding portion 132, in which the electrode lead 124 and the converging portion 131 where the electrode uncoated portions 124 are collected are welded and bonded. Therefore, additional heat generation may be prevented by cutting off the supply of current, and the safety of the battery may be promoted.

Blocking of the electrical connection in the bonding portion 132 may enable to block the electrical connection between the electrode lead 124 and the converging portion 131 where the electrode uncoated portions 123 converge. Therefore, electrical connection between one or more electrode uncoated portions 123 and the electrode lead 124 may be blocked.

As set forth above, according to an embodiment, a secondary battery including a polymer compound layer of which the volume changes at a specific temperature or higher is provided, and the electrical connection between the electrode tab and the electrode lead may be blocked at the cell-level, thereby preventing additional current from being applied. Accordingly, stable performance and stability of remaining cells in the battery pack and module may be secured by suppressing thermal runaway and battery explosion.

Only specific examples of implementations of certain embodiments are described. Variations, improvements and enhancements of the disclosed embodiments and other embodiments may be made based on the disclosure of this patent document.

What is claimed is:

1. A secondary battery comprising:
an electrode assembly including positive electrodes and negative electrodes alternately stacked in a battery case and separators interposed between the positive and negative electrodes,
wherein each of the positive electrodes and each of the negative electrodes include an electrode portion in which an electrode mixture layer containing an electrode active material is formed on a portion of an electrode current collector, and an electrode uncoated portion not including the electrode mixture layer,
wherein the electrode assembly comprises a converging portion in which ends of the electrode uncoated portions are collected and a bonding portion in which at least a portion of the converging portion and an electrode lead are joined, and a portion of the electrode lead protrudes to an outside of the battery case,
at least one of the positive electrodes and the negative electrodes includes a polymer compound layer on at least a portion of one surface or both surfaces of the electrode uncoated portion,
wherein the polymer compound layer is formed on a portion of the electrode uncoated portion between the electrode portion and the converging portion and
the polymer compound layer includes an expandable polymer compound of a composite of a hydroxyl group-containing compound and silica,
wherein the expandable polymer compound is a composite of polyurethane and silica.

2. The secondary battery of claim 1, wherein electrode uncoated portions of the negative electrodes and the positive electrodes located on outermost portions among the electrode uncoated portions include the polymer compound layer on a surface facing an inner surface of the electrode assembly.

3. The secondary battery of claim 1, wherein the polymer compound layer increases in volume by 30 to 4,000 times at 80° C. or higher compared to a volume at room temperature.

4. The secondary battery of claim 1, wherein the polymer compound layer has a thickness of 3 to 25 µm.

5. The secondary battery of claim 1, wherein the polymer compound is in a form of beads, pillars, flakes, or powder.

6. The secondary battery of claim 1, wherein the polymer compound comprises expanded graphite filled inside of the polymer compound.

7. The secondary battery of claim 1, wherein the polymer compound layer is biased toward the converging portion.

8. The secondary battery of claim 7, wherein a ½ point of a total length of the polymer compound layer is located on a side of the converging portion with a ½ point of a length of the electrode uncoated portion between the electrode portion and the converging portion as a center.

9. The secondary battery of claim 1, wherein the polymer compound layer is biased toward the electrode portion.

10. The secondary battery of claim 1, wherein a ½ point of a total length of the polymer compound layer is the same as a ½ point of a length of the electrode uncoated portion between the electrode portion and the converging portion.

11. The secondary battery of claim 1, wherein the electrode leads of the positive electrodes and the negative electrodes protrude in opposite directions of the battery case.

12. The secondary battery of claim 1, wherein the electrode leads of the positive electrodes and the negative electrodes protrude in the same direction of the battery case.

* * * * *